:::: {.flex}

(12) United States Patent
Myojin (10) Patent No.: US 8,106,561 B2
(45) Date of Patent: Jan. 31, 2012

::::

(54) LAMINATED CORE AND METHOD FOR MANUFACTURING THE SAME

(75) Inventor: Iwao Myojin, Kitakyushu (JP)

(73) Assignee: Mitsui High-tec, Inc., Kitakyushu-shi, Fukuoka (JP)

( * ) Notice: Subject to any disclaimer, the term of this patent is extended or adjusted under 35 U.S.C. 154(b) by 365 days.

(21) Appl. No.: 12/527,784

(22) PCT Filed: Apr. 21, 2008

(86) PCT No.: PCT/JP2008/057697
§ 371 (c)(1), (2), (4) Date: Aug. 19, 2009

(87) PCT Pub. No.: WO2008/139843
PCT Pub. Date: Nov. 20, 2008

(65) Prior Publication Data

US 2010/0090560 A1    Apr. 15, 2010

(30) Foreign Application Priority Data

May 9, 2007    (JP) .................................. 2007-124822

(51) Int. Cl.
*H02K 1/06* (2006.01)
*H02K 1/14* (2006.01)

(52) U.S. Cl. ... 310/216.043; 310/216.013; 310/216.041; 310/216.044; 29/596

(58) Field of Classification Search ........... 310/216.005, 310/216.009, 216.011, 216.013, 216.043, 310/216.041, 216.044, 216.048, 216.063; 29/596

See application file for complete search history.

(56) References Cited

U.S. PATENT DOCUMENTS

2003/0127938 A1    7/2003    Shen et al.

FOREIGN PATENT DOCUMENTS

JP    1-264548 A    10/1989
(Continued)

OTHER PUBLICATIONS

Machine Translation JP2007068310 (2007), JP2007049774 (2007) and JP2006166500 (2006).*

(Continued)

*Primary Examiner* — Quyen Leung
*Assistant Examiner* — Jose Gonzalez Quinones
(74) *Attorney, Agent, or Firm* — Westerman, Hattori, Daniels & Adrian, LLP (57) ABSTRACT

A laminated core 10 including a plurality of segment core sheets 13 spirally wound and laminated in layers while connecting portions 12 connecting the adjacent segment core sheets 13 are bent, ends of the segment core sheets 13 are aligned with each other and the connecting portions 12 in the adjacent layers are circumferentially displaced relative to each other, the connecting portions 12 located in outer peripheral areas 11 of the segment core sheets 13, the laminated core 10 comprising:

a concave cutout 22 formed on a radially outward side of the connecting portion 12, the concave cutout 22 accommodating a radially expanded part 21 within an outer circle of the laminated core 10, the radially expanded part 21 formed in the connecting portion 12 radially outward at the bending of the connecting portion 12;

an interior cutout 23 formed on a radially inward side of the connecting portion 12, the interior cutout 23 defining a bent position of the connecting portion 12; and depressed receptacles 16, 17 respectively formed on a top side and a bottom side of a radially outward area of the segment core sheet 13 except for the connecting portions 12, the depressed receptacles 16, 17 each receiving a thickness-direction expanded part 15 formed in the connecting portion 12 in a thickness direction thereof at the bending of the connecting portion 12.

20 Claims, 7 Drawing Sheets

FOREIGN PATENT DOCUMENTS

| | | | |
|---|---|---|---|
| JP | 08-196061 A | | 7/1996 |
| JP | 11-262202 A | | 9/1999 |
| JP | 11-289695 A | | 10/1999 |
| JP | 2004-505595 A | | 2/2004 |
| JP | 2005-168128 A | | 6/2005 |
| JP | 2006166500 A | * | 6/2006 |
| JP | 2007049774 A | * | 2/2007 |
| JP | 2007068310 A | * | 3/2007 |
| JP | 2007-143257 A | | 6/2007 |

OTHER PUBLICATIONS

International Search Report for PCT/JP2008/057697, date of mailing Jul. 29, 2008.

* cited by examiner

PRIOR ART

FIG. 7(A) <escape hole>

FIG. 7(B) <cutout>

(plan view)

(sectional view taken on line)

PRIOR ART

LAMINATED CORE AND METHOD FOR MANUFACTURING THE SAME

TECHNICAL FIELD

The present invention relates to a laminated core and a method for manufacturing the same, the laminated core being formed by spirally winding and laminating plural segment core sheets connected by connecting portions. The term "laminated core" as used herein refers to a stator and a rotor used for a motor and a generator.

BACKGROUND ART

Conventionally, to improve yield of core materials used for production of laminated cores, a method of producing wound cores has been known which includes punching out plural segment core sheets connected in a band shape from a magnetic steel strip, and winding and laminating the band of core sheets. Production of the wound cores does not employ blanking of annular shaped core sheets from a core material. In particular, as disclosed in Patent Documents 1 to 3, for example, arc-shaped segment core sheets connected by connecting portions are punched out of a core material by means of die devices. The segment core sheets each have a predetermined number of slots. Then, the connecting portions which are located in the outer peripheral areas are bent and the side edges of the adjacent segment core sheets are fitted to each other to wind and laminate the plural continuous core sheets in a spiral form.

In the conventional art disclosed in the Patent Documents 1 to 3, however, at the time of bending the connecting portions to position the plural segment core sheets in an annular form, expanded parts are formed in the connecting portions in the thickness direction thereof. The expanded parts create gaps between the laminated segment core sheets, causing the obtained laminated core to have uneven thickness. The gaps reduce efficiency of the motor or cause vibration therein to negatively affect the motor quality.

FIGS. 6(A), 6(B) and 7(A), 7(B) illustrate examples of techniques for eliminating the gaps created by the expanded parts.

Figure 6A:
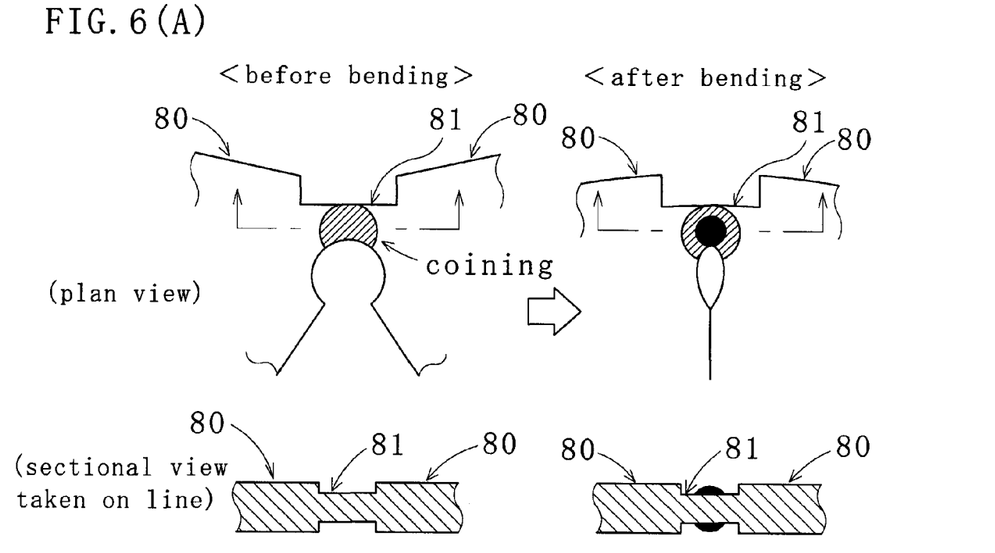
FIGS. 6(A) and 6(B) each illustrate a conventional technique to prevent expansion of connecting portions in the thickness direction.

In the technique of FIG. 6(A), sections of connecting portions 81 to be subject to compression stress are coined (pressed) in the step of punching out plural segment core sheets 80 in order to reduce the increase in thickness (material thickness) caused by bending of the connecting portions 81. The technique allows the bent connecting portions 81 to have thickness equal to or less than that before the coining, even if the thickness is increased.

Figure 6B:
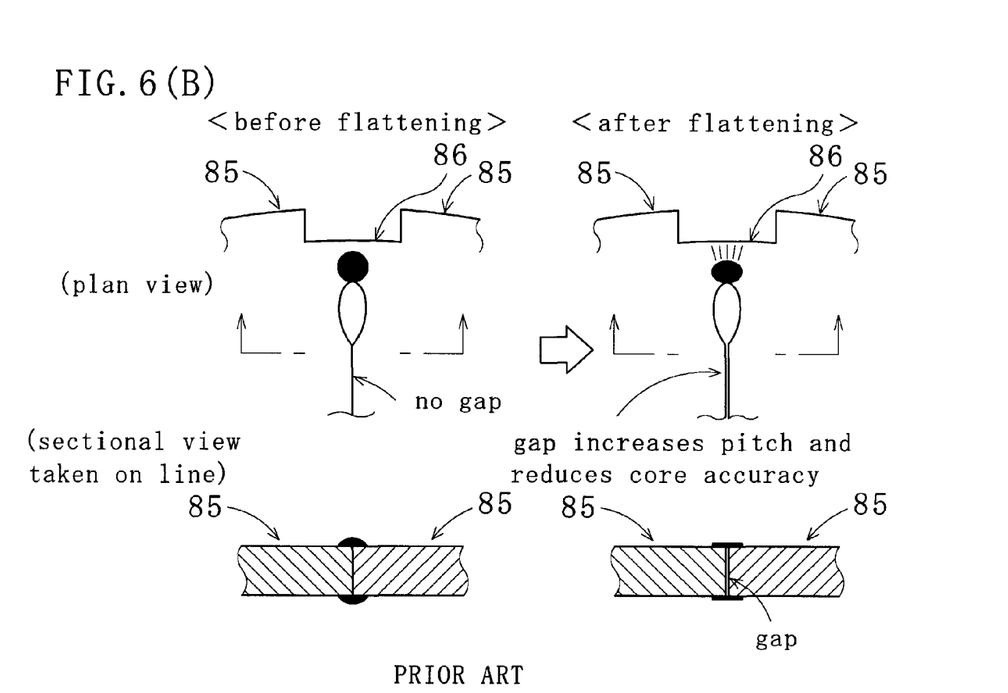

In the technique of FIG. 6(B), after bending of connecting portions 86 located between segment core sheets 85, sections of the connecting portions 86 increased in thickness by the bending are flattened in the thickness direction thereof.

Figure 7A:
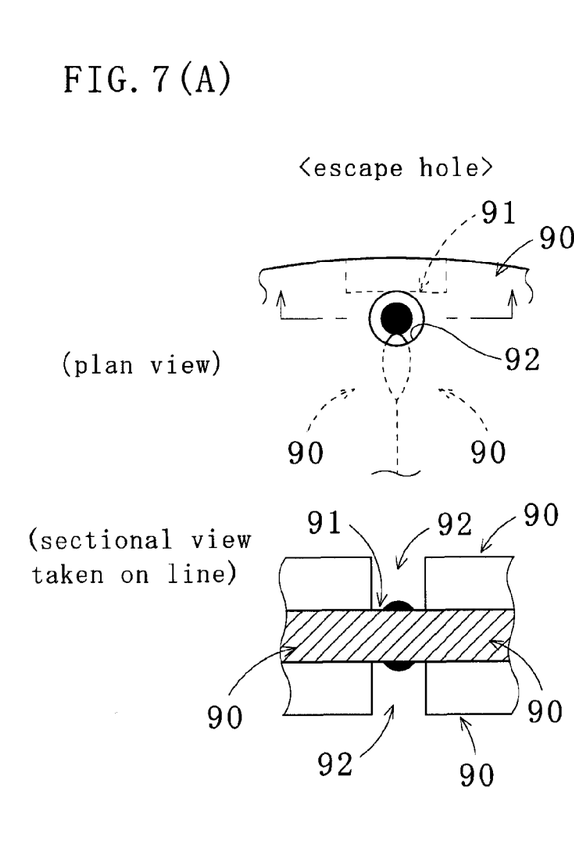
FIGS. 7(A) and 7(B) each illustrate another conventional technique to prevent expansion of connecting portions in the thickness direction.

In the technique of FIG. 7(A), through-holes 92 are formed in segment core sheets 90 so that sections of the connecting portions 91 increased in thickness by bending of the connecting portions 91 can escape into the through-holes 92 in the segment core sheets 90 laminated above and below the connecting portions 91.

Figure 7B:
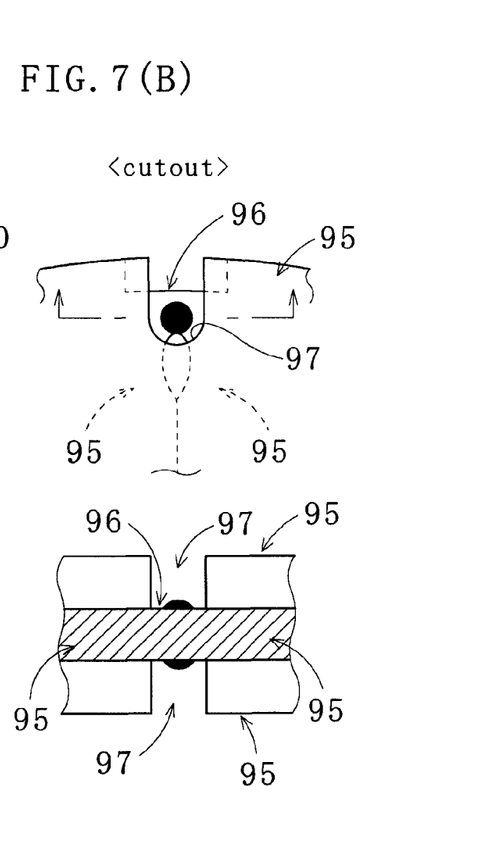

In the technique of FIG. 7(B), cutouts 97 are formed in segment core sheets 95 so that sections of the connecting portions 96 increased in thickness by bending of the connecting portions 96 can escape into the cutouts 97 in the segment core sheets 95 laminated above and below the connecting portions 96.

[Patent Document 1]
Japanese Unexamined Patent Application Publication No. 01-264548
[Patent Document 2]
Japanese Unexamined Patent Application Publication No. 08-196061
[Patent Document 3]
Japanese Translation of PCT International Application No. 2004-505595

DISCLOSURE OF INVENTION

Problem to be Solved by the Invention

However, the above techniques have the following problems. While the coining of the connecting portions 81 as illustrated in FIG. 6(A) reduces the thickness of the bent connecting portions 81 to not more than the thickness before the coining, it hardens the coined sections and makes them apt to be torn at the time of bending. Furthermore, the coining decreases the strength of the connecting portions 81 having a radial width as narrow as 1 mm or less to pose the risk of cutting of the connecting portions 81 during the feed of the segment core sheets 80.

Cut ends of the connecting portions 81 produced by such cutting during the feed of the segment core sheets 80 or during bending of the connecting portions 81 interfere with each other at the time of winding the segment core sheets 80 to prevent arrangement of the adjacent segment core sheets 80 with no gaps therebetween. The gaps lead to problems such as reduced dimensional accuracy of the laminated core and decreased working efficiency in winding the segment core sheets 80. Furthermore, the cut ends, if protruding beyond the outer circle of the laminated core, need to be removed, and thus additional steps therefor are required. Furthermore, there is a limit on the coining depth, and thus the technique of FIG. 6(A) is inapplicable to materials that produce an increase in the thickness of the connecting portions 81 more than allowed by the limit of the coin depth.

Also, the flattening of the expanded sections of the bent connecting portions 86 as illustrated in FIG. 6(B) stretches the material at the connecting portions 86 in the circumferential direction thereof, to create gaps between the adjacent segment core sheets 85. The gaps lead to irregular pitches in the wound segment core sheets 85 and thus reduce dimensional accuracy of the laminated core.

Furthermore, as illustrated in FIG. 7(A), through-holes 92 (escape holes) for receiving the expanded parts of the connecting portions 91 are formed in the segment core sheets 90 located vertically adjacent to the expanded parts. As illustrated in FIG. 7(B), cutouts 97 for receiving the expanded parts of the connecting portions 96 are formed in the segment core sheets 95 located vertically adjacent to the expanded parts. The formation of such through-holes and cutouts might reduce the performance of motors that employ the laminated cores, depending on motor types.

The present invention has been made in view of the above circumstances, and it is an object of the present invention to provide a laminated core which enables manufacture of high-efficient and high-quality products free from influences by expanded parts of connecting portions in the thickness direction thereof, and a method for manufacturing the laminated core.

Means for Solving Problem

To accomplish the object, in a first aspect, the present invention provides a laminated core, including a plurality of segment core sheets spirally wound and laminated in layers while connecting portions connecting the adjacent segment core sheets are bent, radially inward or outward ends of the segment core sheets are aligned with each other to be positioned on the circumference of the same circle, and the connecting portions in the adjacent layers are circumferentially displaced relative to each other, the connecting portions located in outer peripheral areas of the segment core sheets, the laminated core comprising:

a concave cutout formed on a radially outward side of the connecting portion, the concave cutout accommodating a radially expanded part within an outer circle of the laminated core, the radially expanded part formed in the connecting portion radially outward at the bending of the connecting portion;

an interior cutout formed on a radially inward side of the connecting portion, the interior cutout defining a bent position of the connecting portion; and depressed receptacles respectively formed on a top side and a bottom side of a radially outward area of the segment core sheet except for the connecting portions, the depressed receptacles each receiving a thickness-direction expanded part formed in the connecting portion in a thickness direction thereof (i.e., of the connecting portion) at the bending of the connecting portion.

The term "outer peripheral area" as used herein refers to an area of the segment core sheet from the radially outward edge to the radially inward portion of the edge, for example, an area (having a width in the radial direction) equal to $1/30$ to $1/5$, of the maximum width in the radial direction of the segment core sheet, from the radially outward edge thereof. The same applies to a method for manufacturing a laminated core in a second aspect of the present invention. Alternatively, the "outer peripheral area" may be an area having a width in the radial direction equal to $1/30$ to $1/2$, of the maximum width in the radial direction of the segment core sheet (exclusive of magnetic pole sections in the case of a laminated stator core), from the radially outward edge of the segment core sheet. The same applies to the following embodiments.

According to the laminated core in the first aspect of the present invention, it is preferable that the depressed receptacle has any one of a circular cone shape, a truncated circular cone shape, a four-sided pyramidal shape, a truncated four-sided pyramidal shape, a part-spherical shape, and, when viewed from above, a polygonal shape. According to the laminated core in the first aspect of the present invention, it is preferable that the depressed receptacle has a depth of 0.15 times to 0.3 times the thickness (generally, 0.15 mm to 0.5 mm) of the segment core sheet.

According to the laminated core in the first aspect of the present invention, it is further preferable that the depressed receptacle has a through-hole in a center.

According to the laminated core in the first aspect of the present invention, it is preferable that the through-hole has a volume of 0.7 times to 1.5 times the total volume of the depressed receptacles on the top and bottom sides of the segment core sheet exclusive of the through-hole.

According to the laminated core in the first aspect of the present invention, it is preferable that the adjacent segment core sheets have, on lateral sides, a concave part and a convex part to be engaged therein, the concave part and the convex part forming an engagement section.

Each of the concave and convex parts preferably has, but not limited to, a semicircle shape or a sector (arc) shape with a central angle of 50° or more but less than 180°.

The laminated core in the first aspect of the present invention may be a laminated stator core wherein each of the segment core sheets has a plurality of magnetic pole sections radially inward of a yoke section thereof, the connecting portion connecting the yoke sections of the adjacent segment core sheets.

The laminated core in the first aspect of the present invention may be a laminated rotor core wherein each of the segment core sheets has permanent-magnet mounting sections radially outward of a yoke section thereof, the connecting portion connecting the yoke sections of the adjacent segment core sheets. The permanent-magnet mounting section may be, but not limited to, a through-hole to fully enclose a permanent magnet or a groove to partially enclose the same (The same applies to a method for manufacturing a laminated core in a second aspect of the present invention).

To accomplish the object, in a second aspect, the present invention provides a method for manufacturing a laminated core, including forming a plurality of segment core sheets connected to each other by connecting portions, the connecting portions located in outer peripheral areas of the segment core sheets, and spirally winding and laminating the plurality of segment core sheets in layers while bending the connecting portions, fitting side edges of the adjacent segment core sheets to each other, and circumferentially displacing the connecting portions in the adjacent layers relative to each other, the method comprising:

at the time of forming the segment core sheets,

Step A of forming a concave cutout on a radially outward side of the connecting portion, the concave cutout accommodating a radially expanded part within an outer circle of the laminated core, the radially expanded part to be formed in the connecting portion radially outward at the bending of the connecting portion;

Step B of forming an interior cutout on a radially inward side of the connecting portion, the interior cutout defining a bent position of the connecting portion; and Step C of forming depressed receptacles in a radially outward area of the segment core sheet except for the connecting portions, the depressed receptacle receiving a thickness-direction expanded part to be formed in the connecting portion in a thickness direction thereof at the bending of the connecting portion.

Steps A, B, and C may be carried out in any order, or simultaneously. Furthermore, one or more of Steps A to C may be carried out simultaneously with additional step or steps.

According to the method in the second aspect of the present invention, it is preferable that the depressed receptacle has any one of a circular cone shape, a truncated circular cone shape, a four-sided pyramidal shape, a truncated four-sided pyramidal shape, a part-spherical shape, and, when viewed from above, a polygonal shape.

According to the method in the second aspect of the present invention, it is preferable that a through-hole is formed in a center of the depressed receptacle in advance for allowing escape of excess metal generated by press forming the depressed receptacle.

According to the method in the second aspect of the present invention, it is preferable that the through-hole has a diameter of $1/4$ to $1/2$ of the maximum width of the depressed receptacle.

According to the method in the second aspect of the present invention, it is preferable that the laminated core is a laminated stator core wherein each of the segment core sheets has a plurality of magnetic pole sections radially inward of a yoke section thereof, the connecting portion connecting the yoke sections of the adjacent segment core sheets. It is preferable that the inward magnetic pole sections are aligned with each other in the laminating direction when the segment core sheets are spirally wound.

According to the method in the second aspect of the present invention, it is preferable that the laminated core is a laminated rotor core wherein each of the segment core sheets has permanent-magnet mounting sections radially outward of a yoke section thereof, the connecting portion connecting the yoke sections of the adjacent segment core sheets. It is preferable that the segment core sheets are spirally wound with respect to engagement recesses located on the radially inward sides of the inward yoke sections. Alternatively, the outward sides of the segment core sheets, for example, may be aligned with each other while the segment core sheets are spirally wound.

Effect of the Invention

According to the laminated core in the first aspect of and the method in the second aspect of the present invention, the depressed receptacles are formed in a radially outward area of the segment core sheet except for the connecting portions, the depressed receptacles respectively formed on top and bottom sides of the segment core sheet, the depressed receptacle receiving a thickness-direction expanded part formed in the connecting portion in a thickness direction thereof at the bending of the connecting portion. This constitution prevents the thickness-direction expanded parts from forming clearances between the laminated segment core sheets.

Accordingly, the segment core sheets are closely laminated to improve magnetic efficiency and thus efficiency of the apparatus. In addition, the closely laminated segment core sheets with no clearances reduce vibrations and noises in use of the apparatus. Furthermore, since the laminated core with no clearances has circularity, squareness, and height as previously specified, quality control thereof is facilitated and motor quality is enhanced.

According to the laminated core in the first aspect of and the method in the second aspect of the present invention, the depressed receptacle has a simple shape if the depressed receptacle has any one of a circular cone shape, a truncated circular cone shape, a four-sided pyramidal shape, a truncated four-sided pyramidal shape, a part-spherical shape, and, when viewed from above, a polygonal shape. In particular, the depressed receptacle with a truncated circular cone shape or a truncated four-sided pyramidal shape has advantages in that its formation is easy and wear of cutting blades is reduced.

According to the laminated core in the first aspect of the present invention, if the depressed receptacle has a depth of 0.15 times to 0.3 times the thickness (in general, 0.15 mm to 0.3 mm) of the segment core sheet, the depressed receptacle is defined in depth so as to take in the thickness-direction expanded part formed in the connecting portion by the bending thereof, thereby providing the laminated core having a uniform height.

According to the laminated core in the first aspect of and the method in the second aspect of the present invention, if the depressed receptacle has a through-hole in a center, the excess metal produced by press forming the depressed receptacle move toward the through-hole to make the surface of the segment core sheet free from projections of excess metal (i.e., metal which has escaped from the pressed area).

According to the laminated core in the first aspect of the present invention, if the through-hole has a volume of 0.7 times to 1.5 times the total volume of the depressed receptacles on the top and bottom sides of the segment core sheet exclusive of the through-hole, it is ensured that the surface of the segment core sheet is free from the projections of excess metal.

According to the laminated core in the first aspect of the present invention, if the adjacent segment core sheets have, on lateral sides, a concave part and a convex part to be engaged therein, the concave part and the convex part forming an engagement section, the adjacent segment core sheets connected only by the radially narrow connecting portion are positioned with respect to each other. Thus, the adjacent segment core sheets are radially positioned with respect to each other and the bending angle therebetween is fixed to increase annularity, i.e., circularity, that the segment core sheets acquire when the connecting portions are bent.

According to the method in the second aspect of the present invention, if the through-hole has a diameter of ¼ to ½ of the maximum width of the depressed receptacle, the through-hole is defined in diameter relative to the maximum width of the depressed receptacle. This prevents reductions in the strength and performance of the laminated core caused by an increase in the size of the through-holes. Consequently, less restriction is placed on application of the laminated core.

EXPLANATION OF REFERENCES

10: Laminated core, 11: Outer peripheral area, 12: Connecting portion, 13: Segment core sheet, 13a: Core sheet band, 14: Side edge, 15: Thickness-direction expanded part, 16, 17: Depressed receptacles, 18: Yoke section, 19: Magnetic pole section, 20: Slot, 21: Radially expanded part, 22: Concave cutout, 23: Interior cutout, 24: Innermost, 25: Through-hole, 26-45: Depressed receptacles, 46: Concave part, 47: Convex part, 48: Engagement section, 50: Segment core sheet, 51: Yoke section, 52, 53: Permanent-magnet insertion holes, 54: Outer peripheral area, 55: Connecting portion, 56: Concave cutout, 57: Interior cutout, 57a: Depressed receptacle, 58: Side edge, 59: Concave part, 60: Convex part, 62: Engagement recess, 63, 64: Notches, 65: Engagement recess, 66: Core sheet band, 67: Round hole, 68: Caulking portion

BEST MODE FOR CARRYING OUT THE INVENTION

Embodiments of the present invention will be described referring to the accompanying drawings for a better understanding of the present invention.

Figure 1:
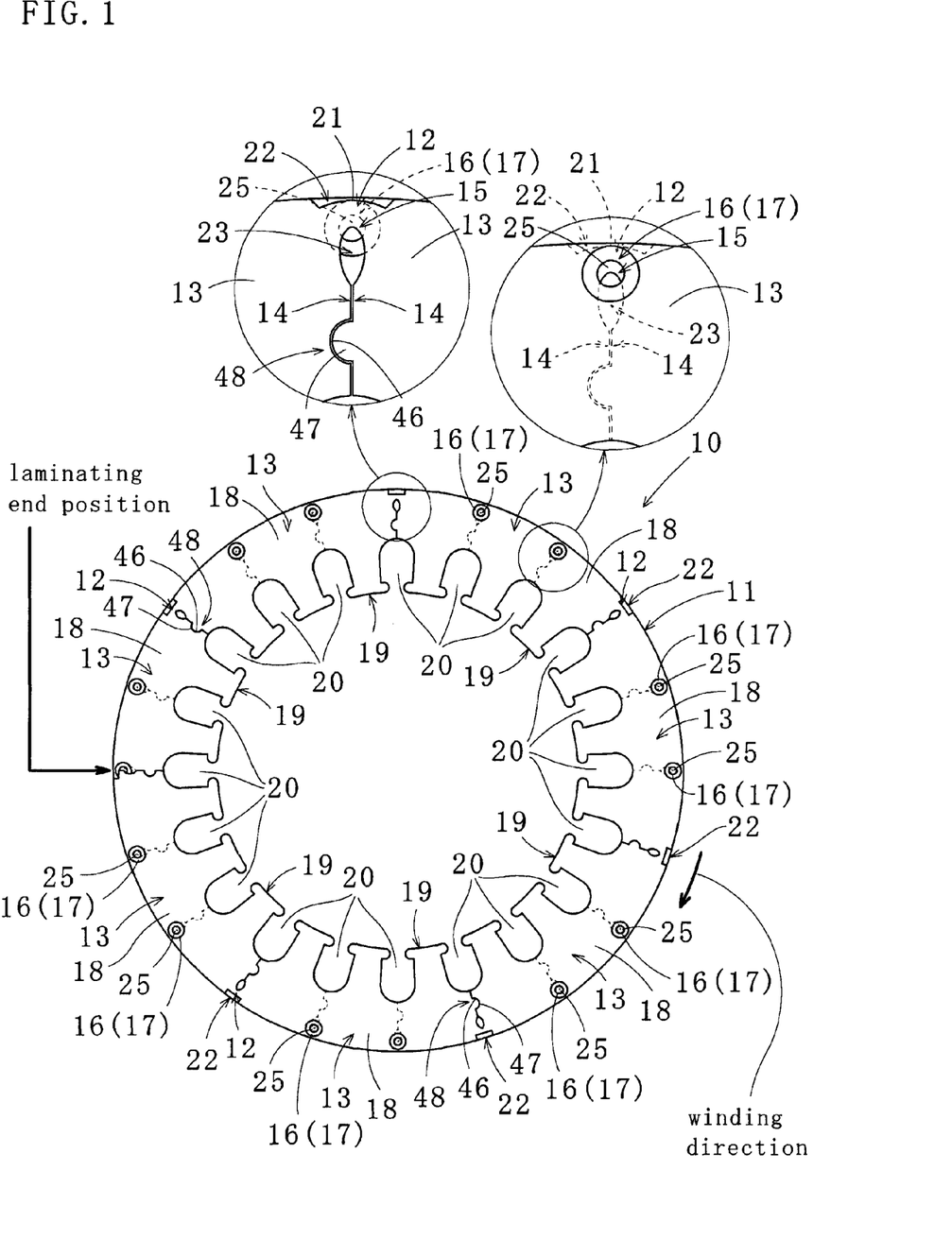
FIG. 1 is a plan view of a laminated core according to a first embodiment of the present invention.
Figure 2:
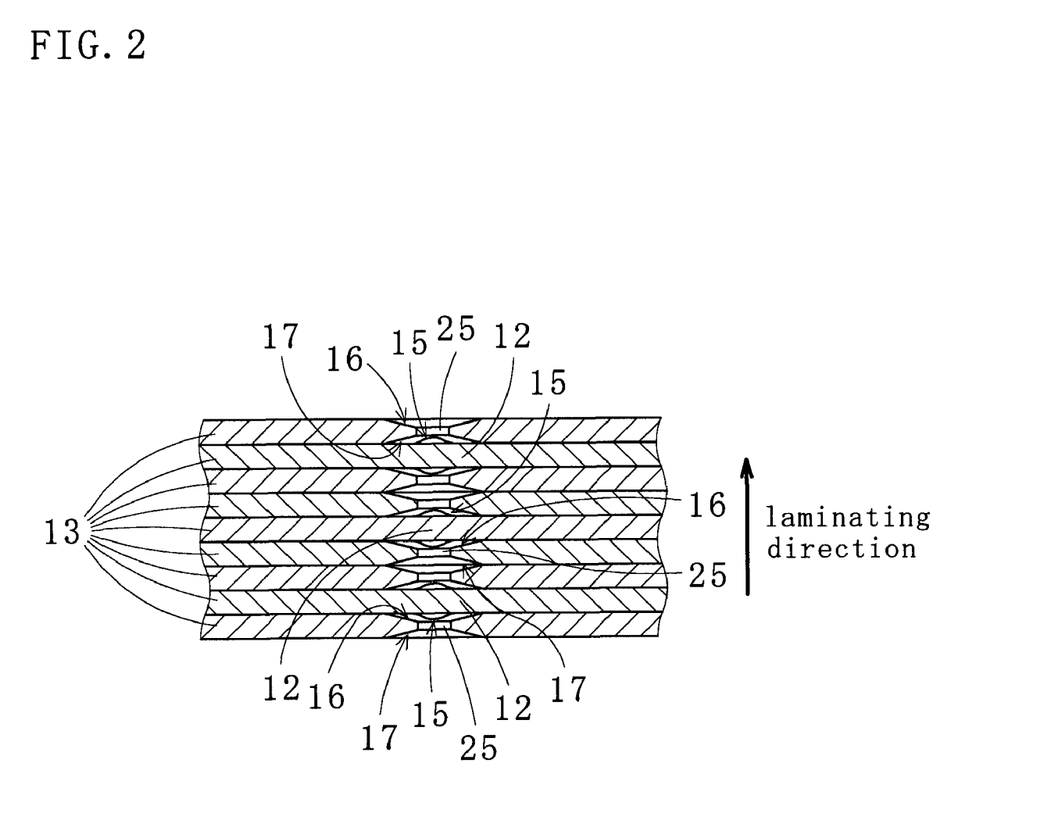
FIG. 2 is a partial sectional side elevation view illustrating the vicinity of depressed receptacles of the laminated core.
Figure 3:
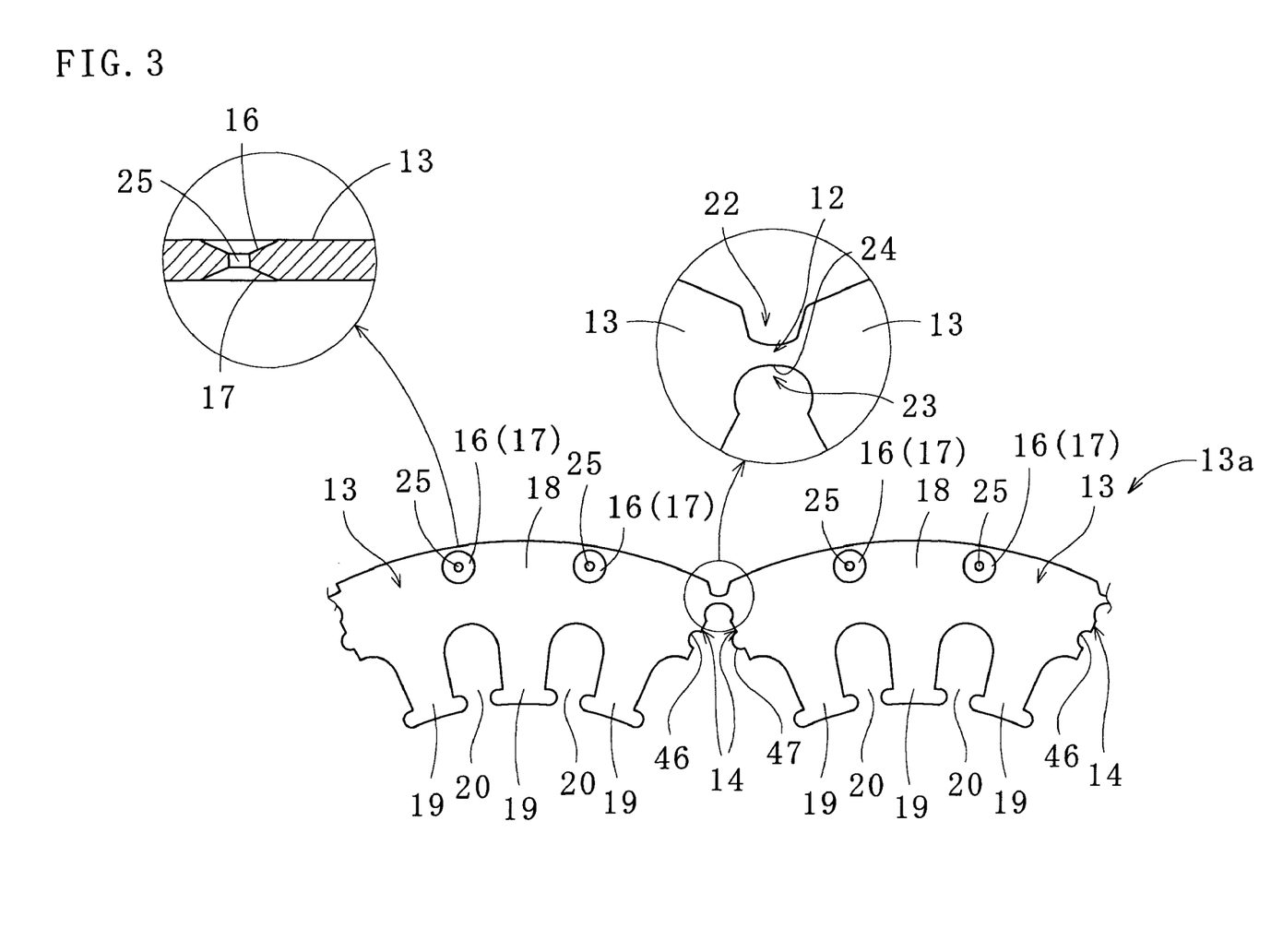
FIG. 3 is a partial plan view illustrating segment core sheets, before being laminated, of the laminated core.
Figure 4A:
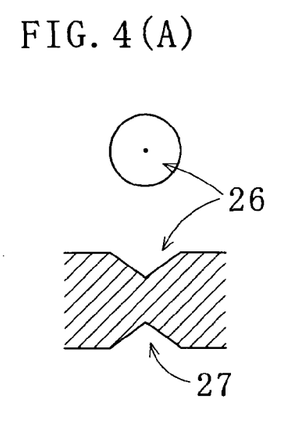
FIGS. 4(A) to 4(J) each illustrate, in plan view and side view, depressed receptacles according to a modification.
Figure 4B:
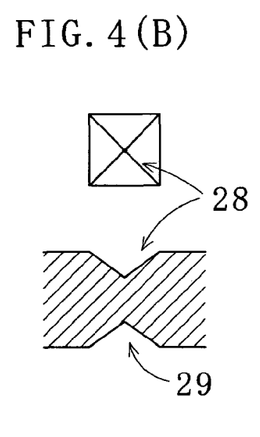
Figure 4C:
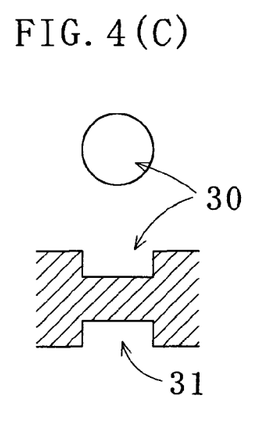
Figure 4D:
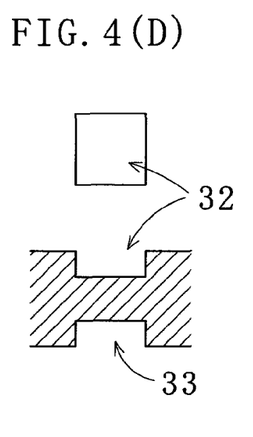
Figure 4E:
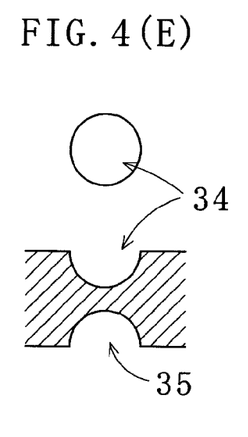
Figure 4F:
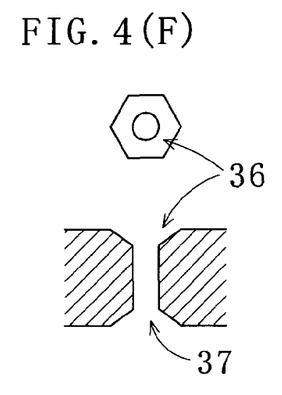
Figure 4G:
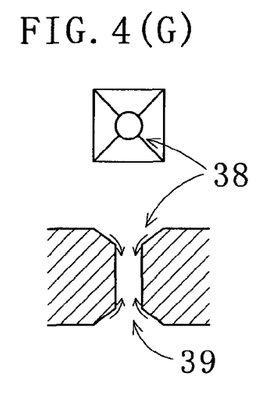
Figure 4H:
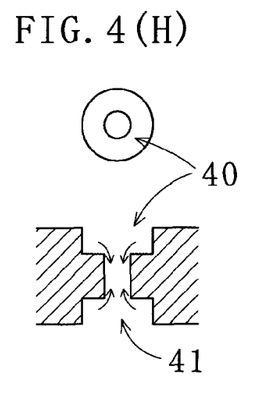
Figure 4I:
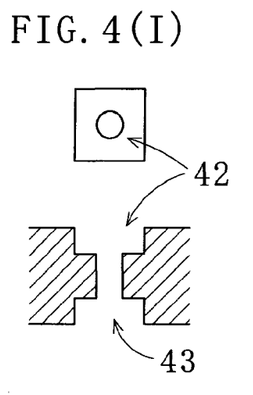
Figure 4J:
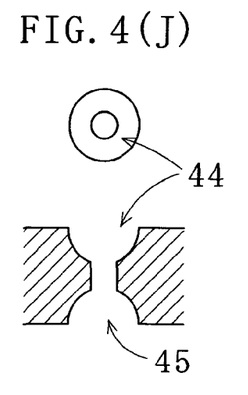

As illustrated in FIGS. 1 to 3, a laminated core 10 according to a first embodiment of the present invention comprises a core sheet band 13a including segment core sheets 13 and connecting portions 12 for connecting the adjacent core sheets 13. The laminated core 10 is formed by spirally winding and laminating the core sheet band 13a while curving the connecting portions 12. It is preferable that radially inward sides (slots 20) or radially outward sides of the segment core sheets 13 are aligned with each other while the core sheets 13 are stacked one on another. In such a case, side edges 14 of the adjacent segment core sheets 13 may be slightly spaced apart from each other. Alternatively, the side edges 14 of the adjacent segment core sheets 13 may be fitted together (i.e., brought into close contact with each other) while the segment core sheets 13 are wound and laminated to wind the core sheet band 13a.

When the connecting portions 12 are bent to position the continuous segment core sheets 13 in an arc or ring form, the connecting portions 12 are located in an area (outer peripheral area 11) having a radial width equal to 1/30 to 1/5, of the radial width of the segment core sheets 13, from the radially outward edges (i.e., outer peripheries) of the segment core sheets 13 to the radially inward positions. Alternatively, when the connecting portions 12 are bent to position the continuous segment core sheets 13 in an arc or ring form, the connecting portions 12 may be located in an area having a radial width equal to 1/30 to 1/2, of the radial width of the segment core sheets 13 except for magnetic pole sections 19, from the radially outward edges to the radially inward sides of the edges.

The laminated core 10 is a laminated stator core (also referred to as "stator") wherein the connecting portions 12 provided in vertically adjacent layers, i.e., in the upper and lower segment core sheets 13, are out of alignment relative to each other in a circumferential direction. Depressed receptacles 16, 17 are respectively formed on the top side and the bottom side in the radially outward area of the segment core sheet 13 excluding the connecting portions 12. The depressed receptacles 16, 17 receive thickness-direction expanded parts 15 formed in the thickness direction of the connecting portions 12 at the bending of the connecting portions 12. A detailed description will follow.

To produce the laminated core 10, a magnetic steel strip (not illustrated) of a thickness of, for example, about 0.15 mm to 0.5 mm is punched by means of die devices to obtain the plural segment core sheets 13 linked by the connecting portions 12. Then, as illustrated in FIGS. 1, 2, the punched out linked segment core sheets 13 are wound, sequentially caulked for interlocking, and laminated. The lamination of the plural segment core sheets may be made by one or more of interlocking, welding, and bonding thereof.

Each of the segment core sheets 13 has an arc-shaped yoke section 18, and a plurality of (in the present embodiment, three) magnetic pole sections 19 located radially inward of the yoke section 18. A plurality of slots 20 are located between the magnetic pole sections 19.

The connecting portions 12 are located between the yoke sections 18 of the adjacent segment core sheets 13 and connect the adjacent segment core sheets 13 in the outer peripheral area 11.

Concave cutouts 22 are formed on the radially outward sides of the connecting portions 12 for receiving radially expanded parts 21 within the outer circumference of the laminated core 10. The radially expanded parts 21 are formed radially outward in the connecting portions 12 at the arching of the connecting portions 12. For this reason, before the arching of the connecting portions 12, the outer peripheral edges of the connecting portions 12 are curved radially inward, as illustrated in FIG. 3.

Interior cutouts 23 are formed on the radially inward sides of the connecting portions 12 (i.e., radially outward areas of the side edges 14), as illustrated in FIGS. 1, 3. The interior cutouts 23 are arc-shaped before the bending of the connecting portions 12. The interior cutouts 23 respectively have innermosts 24 that serve as bending points. The interior cutouts before the bending may be in the shape of, for example, inverted U or inverted V when viewed from above.

After the bending of the connecting portions 12, the interior cutouts 23 become oval-shaped to form gaps between the adjacent segment core sheets 13, thereby preventing contact between radially outward portions of the side edges 14 of the adjacent segment core sheets 13 when the radially inward portions of the side edges 14 are fitted together.

As illustrated in FIGS. 1, 2, when the segment core sheets 13 coupled by the above-mentioned connecting portions 12 are wound and laminated, the connecting portions 12 between adjacent segment core sheets 13 are out of alignment relative to each other in the laminating direction of the segment core sheets, whereas the magnetic pole sections 19 are vertically aligned with each other. In this embodiment, in the lamination of the segment core sheets 13, the vertically adjacent layers are circumferentially shifted relative to each other by one slot. Alternatively, they may be shifted by two slots or more.

Given that the total number of the slots per circle of the laminated core viewed from above is "m"; the number of the slots (equal to the number of the magnetic pole sections) per segment core sheet is "n"; and the number of the segment core sheets per circle necessary to be displaced in the laminating direction by one slot is "k", the following formula is true:

$$(m+1)/n = k,$$

wherein "m," "n," and "k" are positive integers and variable depending on the manufacturing conditions of the laminated core.

In this embodiment, as illustrated in FIG. 1, the total number of the slots per circle of the laminated core viewed from above is 20 (m=20), and the number of the magnetic pole sections per segment core sheet is 3 (equal to the number of the slots: n=3). Obtained from the above formula, the number of the segment core sheets required for one circle is seven (k=7). This means that only one magnetic pole section of the seventh segment core sheet will be in the next layer, resulting in that the connecting portions adjacent in the laminating direction are displaced by one magnetic pole section (equivalent to one slot).

Additionally, if the number of the slots to be displaced in the laminating direction is set to two or more, the number "1" in the above formula is replaced by that number of the slots to be displaced, i.e., two or more, to determine the number of the segment core sheets necessary for one circle. The connecting portions 12 are displaced in the laminating direction while the plural segment core sheets 13 are wound and laminated, and the displaced connecting portions 12 further enhance the strength of coupling between the segment core sheets 13.

Due to the above-described displacement of the connecting portions 12 in the laminating direction, the segment core sheet 13 and the connecting portion 12 are arranged side by side in the laminating direction.

The depressed receptacles 16, 17 are respectively formed on the top side and the bottom side of the radially outward area of the segment core sheet 13 except for the connecting portions 12. The depressed receptacles 16, 17 are substantially equiangularly spaced relative to each other (herein, the centerlines of the slots 20 are aligned with those of the depressed receptacles 16, 17) so that the thickness-direction expanded parts 15 formed in the bent connecting portion 12 in the thickness direction are accommodated within the depressed receptacles 16, 17 of the segment core sheets 13 adjacent in the laminating direction.

As described above, the depressed receptacles 16, 17 are located at the same radial positions as the connecting portions 12 and on the centerlines of the U-shaped slots 20 formed between the adjacent magnetic pole sections 19 in each of the segment core sheets 13.

Each of the depressed receptacles 16, 17 has a truncated circular cone shape, and a through-hole 25 is formed therebetween to allow escape of excess metal generated by press forming the depressed receptacles 16, 17. Preferably, the depressed receptacles 16, 17 are punched out after the formation of the through-hole 25.

Each of the depressed receptacles 16, 17 has an outer diameter of, for example, 1 time to 5 times the minimum radial width of the connecting portion 12 and a depth of 0.15 times to 0.3 times the thickness of the segment core sheet 13. The diameter of the through-hole 25 is ¼ to ½ of the maximum width (the outer diameter) of each of the depressed receptacles 16, 17.

Preferably, the through-hole 25 has a volume of 0.7 times to 1.5 times the total volume of the depressed receptacles 16, 17 exclusive of the through-hole 25. However, the present invention is applicable even to the cases where the through-hole 25 has a volume of less than 0.7 times or more than 1.5 times.

The depressed receptacles 16, 17 and the through-holes 25 are formed in the predetermined positions of the segment core sheets 13, and the depressed receptacles 16, 17 respectively accommodate the thickness-direction expanded parts 15 formed at the bending of the connecting portion 12.

Thus, the laminated core 10 has a uniform height, which improves product dimension accuracy and thereby prevents vibrations and noises during the use of the core 10.

FIGS. 4(A) to 4(J) illustrate modifications of the depressed receptacles. FIGS. 4(A) to 4(E) illustrate depressed receptacles 26 to 35 with no through-holes formed in the centers. The hollows of the depressed receptacles 26 to 35 that are formed in the top and bottom have: a circular cone shape, a four-sided pyramidal shape, a short circular cylindrical shape, a short prismatic shape, and a hemispheric (part-spherical) shape.

FIGS. 4(F) to 4(J) illustrate depressed receptacles 36 to 45 with through-holes formed in the centers. The hollows of the depressed receptacles 36 to 45 have: a truncated six-sided pyramidal shape, a truncated four-sided pyramidal shape, a short circular cylindrical shape, a short prismatic shape, and a hemispheric shape.

The four-sided pyramid and short prism are polygons when viewed from above, and the polygon may be a triangle or a five- or more-sided polygon.

In any of these cases, the hollows of the depressed receptacles preferably have depths equal to or more than the height of the thickness-direction expanded parts 15 formed in the connecting portions 12 at the curving of the connecting portions 12.

According to the configuration described above, the interior cutouts 23 formed on the connecting portions 12 have a favorable hinging effect on the connecting portions 12 at the bending of the connecting portions 12.

At the time of arching of the connecting portion 12, the outer peripheral area thereof is stretched in the circumferential direction to become thinner and form the radially expanded part 21 radially outward. The radially expanded part 21, however, is positioned within the concave cutout 22, thereby causing no adverse effect. On the other hand, the inner peripheral area of the connecting portion 12 is shrunk in the circumferential direction to form the thickness-direction expanded parts 15 in the thickness direction of the connection portion 12. The thickness-direction expanded part 15, however, is positioned within the depressed receptacle 16 of the segment core sheet 13 adjacently below the connecting portion 12 and within the depressed receptacle 17 of the segment core sheet 13 adjacently above the connecting portion 12, and thus cause no adverse effect.

Provided on radially inward areas of the side edges 14 of the adjacent segment core sheets 13 are respectively a concave part 46 and a convex part 47 to be engaged therein which form an engagement section 48. The side edges 14 of the adjacent segment core sheets 13, which respectively include the concave part 46 and the convex part 47, are spaced apart slightly but may be in contact with each other.

With this configuration, mutual positioning accuracy of the adjacent segment core sheets 13 is improved, and thus, accuracy of annular arrangement of the segment core sheets 13 is enhanced.

If the side edges of the adjacent segment core sheets are spaced apart slightly, the contact therebeween is prevented. Thus, adjusting the space between the side edges precludes irregularities in the circumferential pitch of the segment core sheets, which in turn prevents, for example, misalignment of caulking positions of the segment core sheets in the laminating direction. Furthermore, spacing the side edges slightly from each other prevents contact between burrs on the side edges, if any. Such burrs are formed by, for example, worn cutting edges of die devices for blanking the segment core sheets. Preventing contact between burrs precludes irregularities in the circumferential pitch of the segment core sheets.

Now, a description will be made regarding a method for manufacturing the laminated core according to the first embodiment of the present invention.

First, the multiple segment core sheets 13 mutually coupled by the connecting portions 12 as illustrated in FIG. 3 are punched out of the magnetic steel strip (not shown) being fed, by means of one or more of the die devices (not shown).

Performed for punching out the segment core sheets 13 are the following steps: after the commonly performed step of punching out the slots 20, Step A of forming the concave cutouts 22, then Step B of forming the interior cutouts 23, and Step C of forming the depressed receptacles 16, 17. In Step C, the through-holes 25 are created in advance of the formation of the depressed receptacles 16, 17.

Depending on the configurations of the die devices, Steps A to C may be carried out simultaneously, or sequentially, or in different orders. Furthermore, one or more of Steps A to C may be carried out simultaneously with the punching out of the slots 20.

Subsequently, the connecting portions 12 are bent at the innermosts 24 of the interior cutouts 23 as bending points to respectively fit the convex parts 47 into the concave parts 46 of the adjacent segment core sheets 13, to fit together the inward portions of the side edges 14 in the inner sides of the core sheets 13, and to align the magnetic pole sections 19 together. While these processes are carried out, the continuous segment core sheets 13 are spirally wound and laminated such that the connecting portions 12 are staggered relative to each other in the laminating direction. In the end, the laminated core 10 is produced. Preferably, the segment core sheets 13 are spirally wound with the inner sides thereof bound around a cylindrical member of a predetermined diameter.

The depressed receptacles 16, 17 formed in the radially outward area of the segment core sheet 13 respectively accommodate the thickness-direction expanded parts 15 formed in the connecting portions 12 adjacently above and below the receptacles 16 and 17. The thickness-direction expanded parts 15 are housed within the thickness of the segment core sheets 13. This prevents generation of clearances between the segment core sheets 13 adjacent in the laminating direction.

Figure 5:
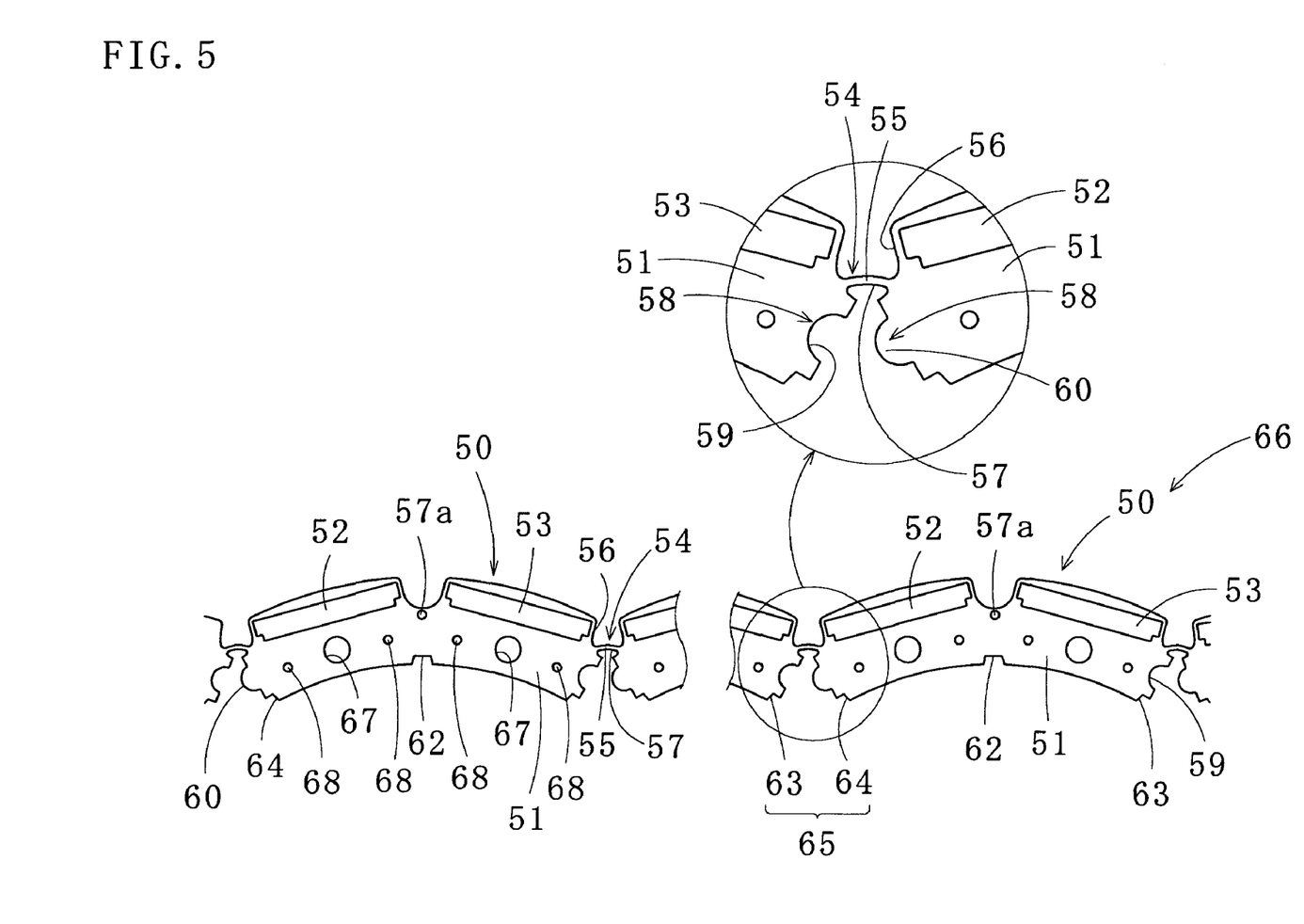
FIG. 5 is a plan view of segment core sheets constituting a laminated core according to a second embodiment of the present invention.

Referring to FIG. 5, a description will be made regarding a laminated core and a method for manufacturing the same according to a second embodiment of the present invention. Segment core sheets 50 are spirally wound to produce a laminated rotor core (not shown). As illustrated in FIG. 5, each segment core sheet 50 includes, in an area radially outward of a yoke section 51, a plurality of (in this embodiment, two) permanent-magnet insertion holes 52, 53, an example of permanent-magnet mounting sections. The permanent-magnet insertion holes 52, 53 are to be magnetic poles of the rotor.

The yoke sections 51 of the adjacent segment core sheets 50 are connected by connecting portions 55 located in an outer peripheral area 54. The outer peripheral area 54 is an area having a radial width equal to ⅟30 to ⅕ (or ⅟30 to ½), of the maximum radial width of the segment core sheet 50, from the outer periphery of the segment core sheet 50 to radially inward thereof. Formed on the radially outward side of the connecting portion 55 is a concave cutout 56. Formed on the radially inward side of the connecting portion 55 is an interior cutout 57 for defining a bent position of the connecting portion 55.

In each of the top and bottom sides of the segment core sheet 50, a depressed receptacle 57a is formed in an area that is radially outward of the yoke section 51 except for the connecting portions 55 and that is between the adjacent permanent-magnet insertion holes 52, 53. The depressed receptacles 57a respectively receive thickness-direction expanded parts formed in the connecting portions 55 in the thickness direction thereof by bending of the connecting portions 55 at winding of the segment core sheets 50. The depressed receptacle 57a has a through-hole in the center. The connecting portion 55 and the depressed receptacle 57a are the same in configuration as their counterparts of the segment core sheet 13 (see FIG. 2).

Provided on side edges 58 of the adjacent segment core sheets 50 are a concave part 59 and a convex part 60 which constitute a positioning engagement section. An engagement recess 62 is formed in between, and radially inward of, the permanent-magnet insertion holes 52, 53 which structure magnetic pole sections. Provided on radially inward portions of the side edges 58 of the adjacent segment core sheets 50 are opposed notches 63, 64 which constitute an engagement recess 65. The vertically adjacent engagement recesses 62, 65 are aligned with each other in spirally winding a core sheet band 66 including the segment core sheets 50 connected by the connecting portions 55.

Formed in the center in the lateral direction of the magnetic pole section of the segment core sheet 50, and in the yoke section 51 radially inward of the magnetic pole section is a round hole 67 used as a pilot hole or a bolt hole. Caulking portions 68 are provided at both sides of the round hole 67.

The core sheet band 66 structured as above is wound on a take-up shaft (not shown) having engagement ribs formed therearound at a predetermined pitch, and the engagement ribs fit in the engagement recesses 62, 65. In this case, the side edges 58 of the adjacent core sheets 50 may be either in contact or spaced apart slightly from each other.

The invention has been described referring to the embodiments. However, it is to be understood that the invention is not limited to the embodiments but includes other embodiments and modifications without departing from the scope as set out in the accompanying claims. For example, laminated cores and methods for manufacturing the same, obtained by combining all or part of such embodiments and modifications, are therefore construed to be within the spirit and scope of the invention.

INDUSTRIAL APPLICABILITY

The laminated core according to the present invention is applied to stators and rotors for use in motors and generators, which facilitates low-cost manufacture of products with higher accuracy.

The invention claimed is:

1. A laminated core, including a plurality of segment core sheets spirally wound and laminated in layers while connecting portions connecting the adjacent segment core sheets are bent, radially inward or outward ends of the segment core sheets are aligned with each other, and the connecting portions in the adjacent layers are circumferentially displaced relative to each other, the connecting portions located in outer peripheral areas of the segment core sheets, the laminated core comprising:
a concave cutout formed on a radially outward side of the connecting portion, the concave cutout accommodating a radially expanded part within an outer circle of the laminated core, the radially expanded part formed in the connecting portion radially outward at the bending of the connecting portion;
an interior cutout formed on a radially inward side of the connecting portion, the interior cutout defining a bent position of the connecting portion; and
depressed receptacles respectively formed on a top side and a bottom side of a radially outward area of the segment core sheet except for the connecting portions, the depressed receptacles each receiving a thickness-direction expanded part formed in the connecting portion in a thickness direction thereof at the bending of the connecting portion.

2. The laminated core as defined in claim 1, wherein the depressed receptacle has any one of a circular cone shape, a truncated circular cone shape, a four-sided pyramidal shape, a truncated four-sided pyramidal shape, a part-spherical shape, and, when viewed from above, a polygonal shape.

3. The laminated core as defined in claim 1, wherein the depressed receptacle has a depth of 0.15 times to 0.3 times the thickness of the segment core sheet.

4. The laminated core as defined in claim 1, wherein the depressed receptacle has a through-hole in a center.

5. The laminated core as defined in claim 4, wherein the through-hole has a volume of 0.7 times to 1.5 times the total volume of the depressed receptacles on the top and bottom sides of the segment core sheet exclusive of the through-hole.

6. The laminated core as defined in claim 1, wherein the adjacent segment core sheets have, on lateral sides, a concave part and a convex part to be engaged therein, the concave part and the convex part forming an engagement section.

7. The laminated core as defined in claim 1, which is a laminated stator core wherein each of the segment core sheets has a plurality of magnetic pole sections radially inward of a yoke section thereof, the connecting portion connecting the yoke sections of the adjacent segment core sheets.

8. The laminated core as defined in claim 1, which is a laminated rotor core wherein each of the segment core sheets has permanent-magnet mounting sections radially outward of a yoke section thereof, the connecting portion connecting the yoke sections of the adjacent segment core sheets.

9. A method for manufacturing a laminated core, including forming a plurality of segment core sheets connected to each other by connecting portions, the connecting portions located in outer peripheral areas of the segment core sheets, and spirally winding and laminating the plurality of segment core sheets in layers while bending the connecting portions, fitting side edges of the adjacent segment core sheets to each other, and circumferentially displacing the connecting portions in the adjacent layers relative to each other, the method comprising:

at the time of forming the segment core sheets,

Step A of forming a concave cutout on a radially outward side of the connecting portion, the concave cutout accommodating a radially expanded part within an outer circle of the laminated core, the radially expanded part to be formed in the connecting portion radially outward at the bending of the connecting portion;

Step B of forming an interior cutout on a radially inward side of the connecting portion, the interior cutout defining a bent position of the connecting portion; and Step C of forming depressed receptacles in a radially outward area of the segment core sheet except for the connecting portions, the depressed receptacle receiving a thickness-direction expanded part to be formed in the connecting portion in a thickness direction thereof at the bending of the connecting portion.

10. The method as defined in claim 9, wherein the depressed receptacle has any one of a circular cone shape, a truncated circular cone shape, a four-sided pyramidal shape, a truncated four-sided pyramidal shape, a part-spherical shape, and, when viewed from above, a polygonal shape.

11. The method as defined in claim 9, wherein a through-hole is formed in a center of the depressed receptacle in advance for allowing escape of excess metal generated by press forming the depressed receptacle.

12. The method as defined in claim 11, wherein the through-hole has a diameter of ¼ to ½ of the maximum width of the depressed receptacle.

13. The method as defined in claim 9, wherein the laminated core is a laminated stator core wherein each of the segment core sheets has a plurality of magnetic pole sections radially inward of a yoke section thereof, the connecting portion connecting the yoke sections of the adjacent segment core sheets.

14. The method as defined in claim 9, wherein the laminated core is a laminated rotor core wherein each of the segment core sheets has permanent-magnet mounting sections radially outward of a yoke section thereof, the connecting portion connecting the yoke sections of the adjacent segment core sheets.

15. A method for manufacturing a laminated core, including forming a plurality of segment core sheets connected to each other by connecting portions, the connecting portions located in outer peripheral areas of the segment core sheets, and spirally winding and laminating the plurality of segment core sheets in layers while bending the connecting portions, fitting inner sides or outer sides of the adjacent segment core sheets to each other, and circumferentially displacing the connecting portions in the adjacent layers relative to each other, the method comprising:

at the time of forming the segment core sheets,

Step A of forming a concave cutout on a radially outward side of the connecting portion, the concave cutout accommodating a radially expanded part within an outer circle of the laminated core, the radially expanded part to be formed in the connecting portion radially outward at the bending of the connecting portion;

Step B of forming an interior cutout on a radially inward side of the connecting portion, the interior cutout defining a bent position of the connecting portion; and Step C of forming depressed receptacles in a radially outward area of the segment core sheet except for the connecting portions, the depressed receptacle receiving a thickness-direction expanded part to be formed in the connecting portion in a thickness direction thereof at the bending of the connecting portion.

16. The method as defined in claim 15, wherein the depressed receptacle has any one of a circular cone shape, a truncated circular cone shape, a four-sided pyramidal shape, a truncated four-sided pyramidal shape, a part-spherical shape, and, when viewed from above, a polygonal shape.

17. The method as defined in claim 15, wherein a through-hole is formed in a center of the depressed receptacle in advance for allowing escape of excess metal generated by press forming the depressed receptacle.

18. The method as defined in claim 17, wherein the through-hole has a diameter of ¼ to ½ of the maximum width of the depressed receptacle.

19. The method as defined in claim 15, wherein the laminated core is a laminated stator core wherein each of the segment core sheets has a plurality of magnetic pole sections radially inward of a yoke section thereof, the connecting portion connecting the yoke sections of the adjacent segment core sheets.

20. The method as defined in claim 15, wherein the laminated core is a laminated rotor core wherein each of the segment core sheets has permanent-magnet mounting sections radially outward of a yoke section thereof, the connecting portion connecting the yoke sections of the adjacent segment core sheets.

* * * * *